United States Patent Office 3,259,477
Patented July 5, 1966

3,259,477
CHEMICAL COMPOSITION AND HYDROCARBON FUEL CONTAINING SAME
John H. Udelhofen, Calumet City, Ill., assignor to Standard Oil Company, Chicago, Ill., a corporation of Indiana
No Drawing. Original application Apr. 28, 1961, Ser. No. 106,198, now Patent No. 3,150,147, dated Sept. 22, 1964. Divided and this application May 22, 1963, Ser. No. 287,457
4 Claims. (Cl. 44—63)

This is a division of application S.N. 106,198, filed April 28, 1961, now U.S. Patent No. 3,150,147.

This invention relates to chemical composition useful as a corrosion inhibitor in hydrocarbon fuels. This invention further relates to hydrocarbon fuel compositions containing new and useful corrosion inhibitors.

The chemical compositions of this invention are salts of 1,2-disubstituted imidazoline and citrimic acid. The salts may be represented by the structural formula:

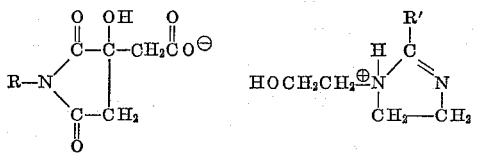

In the formula, R and R' each represent an open-chain aliphatic hydrocarbon radical of 8 to 22 carbon atoms. The hydrocarbon radicals may be a saturated or unsaturated hydrocarbon, e.g., alkyl, radical having either a straight or branched chain.

The salts may conveniently be prepared by reacting equimolar amounts of the corresponding 1,2-disubstituted imidazoline and N-substituted citrimic acid. The reaction proceeds readily at room temperature but the reactants may be heated and agitated if desired to increase the reaction rate. The reaction is complete when heat of reaction ceases to be evolved. The reaction is a neutralization reaction with resulting salt formation; such reactions and their conditions, as well as useable catalysts, are well known to the art.

The citrimic acid and 1,2-disubstituted imidazoline used in the above reaction may be purchased or may be prepared by methods known in the art. The 1,2-disubstituted imidazolines may be prepared by reaction of the corresponding carboxylic acid (R'COOH) with N-hydroxyethyl ethylene diamine until two moles of water are split out; this occurs upon closure of the imidazoline ring. The N-substituted citrimic acid may be prepared by reaction of equimolar amounts of a primary amine (RNH₂) with citric acid under known conditions to form the imido linkage with the resulting splitting out of two moles of water.

Illustrative examples of N-substituted citrimic acid salts of 1,2-disubstituted imidazolines are 1-(2-hydroxyethyl) 2-heptadecenyl imidazolinium N-tallow citrimate,
1-(2-hydroxyethyl)2-(2,4-dimethyl hexyl) imidazolinium N-eicosyl citrimate,
1-(2-hydroxyethyl) 2-palmityl imidazolinium N-caprylyl citrimate,
1-(2-hydroxyethyl) 2-lauryl imidazolinium N-lauryl citrimate,
1-(2-hydroxyethyl) 2-n-octyl imidazolinium N-n-octyl citrimate,
1-(2-hydroxyethyl) 2-n-decenyl imidazolinium N-tallow citrimate,
1-(2-hydroxyethyl) 2-linolenyl imidazolinium N-stearyl citrimate,
1-(2-hydroxyethyl) 2-stearyl imidazolinium N-octadecadienyl citrimate,
1-(2-hydroxyethyl) 2-nonyl imidazolinium N-capryl citrimate,
1-(2-hydroxyethyl) 2-coco imidazolinium N-coco citrimate,
1-(2-hydroxyethyl) 2-eicosyl imidazolinium N-eicosyl citrimate,
1-(2-hydroxyethyl) 2-myristyl imidazolinium N-oleyl citrimate,
1-(2-hydroxyethyl) 2-docosyl imidazolinium N-docosyl citrimate,
1-(2-hydroxyethyl) 2-monohydroxystearyl imidazolinium N-decyl citrimate,
1-(2-hydroxyethyl) 2-linoleyl imidazolinium N-decyl citrimate,
1-(2-hydroxyethyl) 2-soybean imidazolinium N-tallow citrimate,
1-(2-hydroxyethyl) 2-tallow imidazolinium N-tallow citrimate,
1-(2-hydroxyethyl) 2-(3-ethyl hexyl) imidazolinium N-oxooctyl citrimate, and
1-(2-hydroxyethyl) 2-tallow imidazolinium N-coco citrimate.

The terms "coco," "soybean" and "tallow" as used herein designate that the defined group was derived from coco fatty acids, soybean fatty acids and hydrogenated tallow fatty acids. Such fatty acids and the corresponding amines which are derived therefrom are well known to the art. For example, hydrogenated tallow acid predominates in stearic acid and contains a substantial amount of palmitic acid and very small amounts of myristic oleic acids. Coco fatty acid (distilled) contains about 50% lauric acid and the remainder of the acids range from $C_8$ to $C_{18}$, including caprylic, capric, myristic, palmitic, stearic, oleic and linoleic acids. Soybean fatty acids include mixtures of saturated and unsaturated acids in the $C_{16-18}$ range.

The salts of this invention, as described above may be defined in a more particular aspect of this invention as the 1-(2-hydroxyethyl) 2-aliphatic imidazolinium N-aliphatic citrimates wherein the aliphatic groups are the same or different open chain (non-cyclic) aliphatic containing from 8 to 22 carbon atoms. The aliphatic groups may be saturated or unsaturated but are preferably saturated, mono-unsaturated or di-unsaturated.

As a typical preparation of salts of this invention, equimolar amounts of N-tallow citrimic acid and 1-(2-hydroxyethyl) 2-heptadecenyl imidazoline were mixed in isopropyl alcohol solvent with stirring while heating slightly above room temperature for about 30 minutes. The isopropyl alcohol solvent was then evaporated from the resulting product. The product was 1-(2-hydroxyethyl) 2-heptadecenyl imidazolinium N-tallow citrimate.

The above-defined salts are useful as corrosion inhibitors in minor amounts sufficient to inhibit corrosion in hydrocarbon fuels. More advantageously, the salts may be used in amounts of from about 0.00005 to about 1.0 weight percent and preferably in amounts of from about 0.0001 to about 0.0015 weight percent. Concentrates of the salts in hydrocarbon fuels or other suitable solvent, such as xylene, toluene, benzene, phenol, isopropyl alcohol, ethanol, n-butanol, etc., are also intended. Such concentrates may contain the salt in an amount greater than normally used in hydrocarbon fuels as set out above, for example in an amount in the range of 10 to 70% by weight in a suitable solvent. The primary function of the R and R' groups in the above formula is to impart oil-solubility to the chemical compounds for use in hydrocarbon fuels as additives and the particular number of carbon atoms in the R and R' groups is not critical. Other addition agents such as anti-knock agents, anti-ice agents, antioxidants, preignition suppressors, dyes, etc., may also be added to the hydrocarbon fuel composition or additive concentrate when desired. The salts of this invention, in addition to being effective corrosion inhibitors, are also effective rust inhibitors.

The corrosion inhibitors of this invention are effective in both the hydrocarbon and aqueous phases encountered in the handling and storage of fuels. Hydrocarbon phases are present as the fuel itself and the aqueous phases are produced by condensation and in some cases by contamination through seepage or from processing of the fuel. Also present in the fuel in many instances are acidic and/or caustic substances in small amounts resulting from prior treatment of the fuel or a component thereof, e.g., from acid treating and/or caustic treating. Such acidic and/or caustic materials are corrosive toward metal parts such as storage tanks, valves, pipelines, tank cars, burners, etc. Other corrosive substances may be formed through oxidative deterioration of the fuel in the presence of oxygen, particularly if the fuel is stored for substantial periods of time or stored or transported under adversely high temperature conditions. The corrosive materials become distributed throughout both the hydrocarbon and aqueous phases and it becomes desirable, if not necessary, to protect against corrosion of metal parts from both phases. The salts of this invention are useful in giving such protection from corrosion in both phases.

*Examples of citrimates and corrosion inhibited hydrocarbon fuels*

As examples of this invention, various citrimates identified in the table below were prepared by reacting equimolar amounts of the corresponding 1,2-disubstituted imidazoline and N-aliphatic citrimic acid in each case by warming a mixture of the reactants in isopropyl alcohol solvent slightly above room temperature for about 30 minutes. After removal of the solvent, the resulting citrimates were added to hydrocarbon fuels identified in the table in the concentrates shown.

Samples of each of the resulting hydrocarbon fuel compositions (Examples 1 through 8) and other fuel compositions (Preparations A through Q) prepared for comparison purposes were each subjected to the following corrosion test procedure:

Each sample was placed with an equal volume of an aqueous phase in a test tube and stirred briefly to permit the corrosion inhibiting agent to be distributed between the two phases. Stirring was then discontinued. An S-shaped steel test strip, having an electrical terminal at each end of the S was immersed in the oil phase to reach adsorption equilibrium and the electrical resistance was noted as a control resistance value. The steel test strip was then lowered into the aqueous phase and after 24 hours the change in electrical resistance was taken as a measure of corrosion during the 24-hour period. The amount of corrosion was then compared with the amount of corrosion obtained in a control run without the inhibitor. Results are reported in the table in terms of percent reduction in corrosion compared with the control run. One hundred percent reduction is equivalent to absence of measurable corrosion. The aqueous phases used consisted of water containing the amounts of corrosive substances listed in the table below.

TABLE

| Sample | Addition Agent | | Hydrocarbon Fuel | Percent Reduction in Corrosion | |
| --- | --- | --- | --- | --- | --- |
| | Identity | Concentration | | Electrolytes in Aqueous Phase: | |
| | | | | 0.1% NaCl | $3.6 \times 10^{-4}$ HCl |
| Preparations A and B | N-tallow citrimic acid | 1 PTB [1] / 2 PTB | Gasoline [2] / ....do.... | 93 / 96 | 90 / 94 |
| Preparations C and D | 1-(2-hydroxyethyl) 2-heptadecenyl imidazoline | 1 PTB / 2 PTB | Gasoline / ....do.... | 37 / 70 | 55 / 80 |
| Examples 1 and 2 | 1-(2-hydroxyethyl) 2-heptadecenyl imidazolinium N-tallow citrimate. | 1 PTB / 2 PTB | Gasoline / ....do.... | 99 / 99 | 96 / 99 |
| Preparations E and F | Same as Preparations A and B | 1 PTB / 2 PTB | Heater Oil [3] / ....do.... | 92 / 98 | 90 / 98 |
| Preparations G and H | Same as Preparations C and D | 1 PTB / 2 PTB | Heater Oil / ....do.... | 67 / 83 | 70 / 84 |
| Examples 3 and 4 | Same as Examples 1 and 2 | 1 PTB / 2 PTB | Heater Oil / ....do.... | 98 / 100 | 99 / 100 |
| Preparations J and K | N-oleyl citrimic acid | 1 PTB / 2 PTB | Gasoline [2] / ....do.... | 90 / 95 | 90 / 94 |
| Preparations L and M | 1-(2-hydroxyethyl) 2-tallow imidazoline | 1 PTB / 2 PTB | Gasoline / ....do.... | 36 / 72 | 50 / 75 |
| Examples 5 and 6 | 1-(2-hydroxyethyl) 2-tallow imidazolinium N-oleyl citrimate. | 1 PTB / 2 PTB | Gasoline / ....do.... | 99 / 100 | 99 / 100 |
| Preparations N and O | Same as Preparations J and K | 1 PTB / 2 PTB | Heater Oil [3] / ....do.... | 89 / 94 | 85 / 90 |
| Preparations P and Q | Same as Preparations L and M | 1 PTB / 2 PTB | Heater Oil / ....do.... | 65 / 85 | 65 / 82 |
| Examples 7 and 8 | Same as Examples 5 and 6 | 1 PTB / 2 PTB | Heater Oil / ....do.... | 97 / 99 | 96 / 100 |

[1] PTB = Pounds per thousand barrels. 1 PTB is approximately 0.003 weight percent.
[2] A premium grade blended gasoline containing 3 cc.'s tetraethyllead per gallon.
[3] A blend of distillate oils having specifications in the following ranges:
Distillation:
  10% Recovery _____ 348 to 410° F.
  95% Recovery _____ 465° F. or higher.
  End Point _____ 480 to 550° F.
Gravity, °API _____ 41 to 43.

The results reported in the table demonstrate the superiority of the salts (Examples 1–8) of this invention as corrosion inhibitors in comparison with each of two reactants (Preparations A–Q) which may be used to form the salts. In all cases, the salts gave at least about 95% reduction in corrosion.

Although gasoline and heater oil were specifically used in the above examples, the present corrosion inhibitors are useful in any normally liquid hydrocarbon fuel. For example, the hydrocarbon fuel may be a jet, diesel or other internal combustion engine fuel, a burner fuel or other heater or furnace fuel, or the like. More specifically, the fuel or fuel oil may be a diesel fuel, a gasoline, a jet fuel, a heavy industrial residual fuel (e.g., bunker C) a furnace oil, a heater oil fraction, kerosene, a gas oil, etc. The fuel may be cracked or virgin distillate or mixtures thereof. Residual oils are also useable. Advantageously the fuel may boil in the range of about 200 to 750° F., e.g., a distillate fuel oil cut boiling in the 350 to 650° F. range.

Other fuels useable will be readily recognized by those skilled in the art from the above descriptions.

It is evident that I have provided new and useful imidazolinium citrimates and inhibited hydrocarbon fuels containing the same.

I claim:

1. A fuel composition comprising a major amount of a liquid hydrocarbon fuel and an amount sufficient to inhibit rust and corrosion of a salt of 1,2-disubstituted imidazoline and citrimic acid, said salt corresponding to the structural formula:

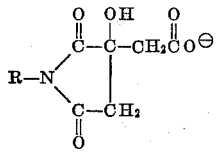 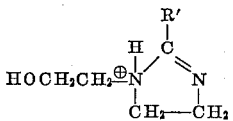

2. The fuel composition of claim 1 wherein said amount of said salt is from 0.00005 to 1.0 weight percent.

3. The fuel composition of claim 1 wherein said hydrocarbon fuel boils in the gasoline distillation range.

4. An addition agent concentrate comprising from 10 to 75% by weight of the salt of claim 1 and a suitable solvent therefor, said concentrate being capable of dilution with a liquid hydrocarbon fuel to a salt content of from 0.00005 to 1.0 weight percent.

References Cited by the Examiner

UNITED STATES PATENTS

| | | | |
|---|---|---|---|
| 2,773,879 | 12/1956 | Sterlin | 44—63 |
| 2,907,646 | 10/1959 | O'Kelly et al. | 44—63 |
| 2,919,979 | 1/1960 | Martin et al. | 44—63 |
| 3,060,007 | 10/1962 | Freedman | 44—63 |

DANIEL E. WYMAN, *Primary Examiner.*

Y. M. HARRIS, *Assistant Examiner.*